June 26, 1962     R. H. SHIMWELL ETAL     3,041,525
ELECTRIC GENERATOR SUPPLY SYSTEMS
Filed May 5, 1958                        4 Sheets-Sheet 1
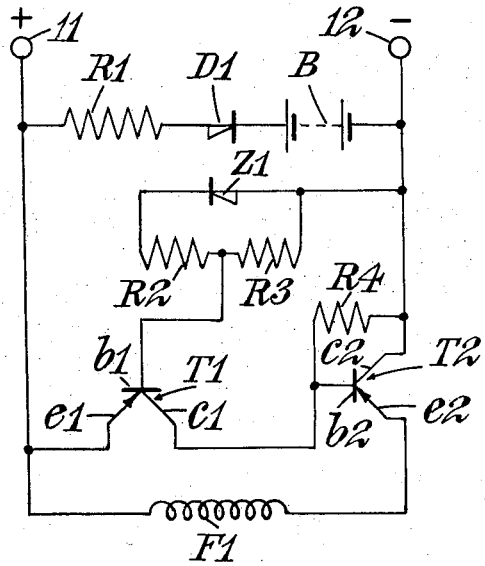
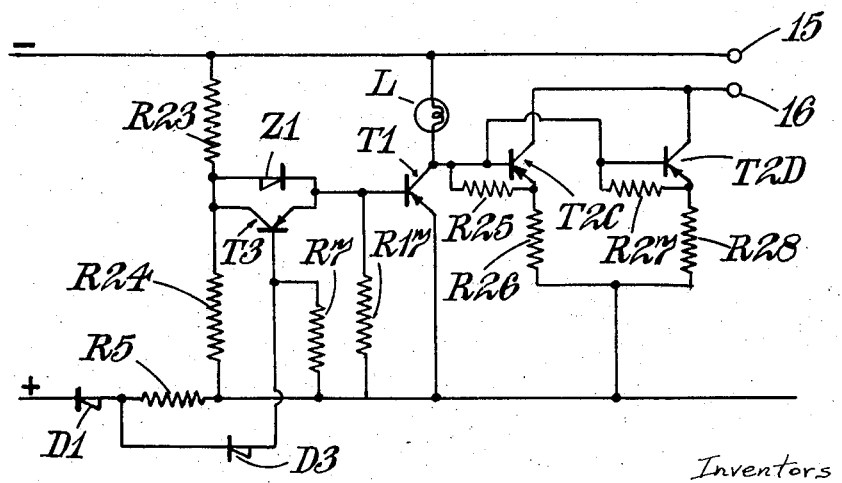

United States Patent Office 3,041,525
Patented June 26, 1962

3,041,525
ELECTRIC GENERATOR SUPPLY SYSTEMS
Rodney Haydn Shimwell and Edward Leyburn Robinson, London, England, assignors to Simms Motor Units Limited, London, England, a British company
Filed May 5, 1958, Ser. No. 733,013
Claims priority, application Great Britain May 23, 1957
4 Claims. (Cl. 322—28)

The invention relates to electric supply systems and is more particularly, but not exclusively, concerned with such systems employing variable speed generators, e.g. in, or for, motor vehicles, aircraft or other craft.

The invention provides an electric supply system including one or more transistors, or other semi-conductor devices, operative to regulate (at least partly) the voltage or the current, or both, of the system.

The system preferably includes a transistor acting as, or controlling, a variable resistance or other impedance in accordance with the voltage or current to be regulated. Preferably the system includes a zener diode or other semiconductor diode or like device which becomes conductive when a voltage in excess of a predetermined value is applied to it, and regulates the flow of electricity in a resistance or other impedance connected in series with it.

Preferably the system includes a generator having a field winding and the transistor or transistors are operative to vary the current through the field winding to provide the regulation.

Some specific examples of systems embodying the invention will now be described by way of example and with reference to the accompanying drawings in which:

FIGURE 1 is a circuit diagram of a system with voltage regulation,

FIGURE 8 is a circuit diagram of a preferred modification of the system of FIGURE 6.

Figure 2:
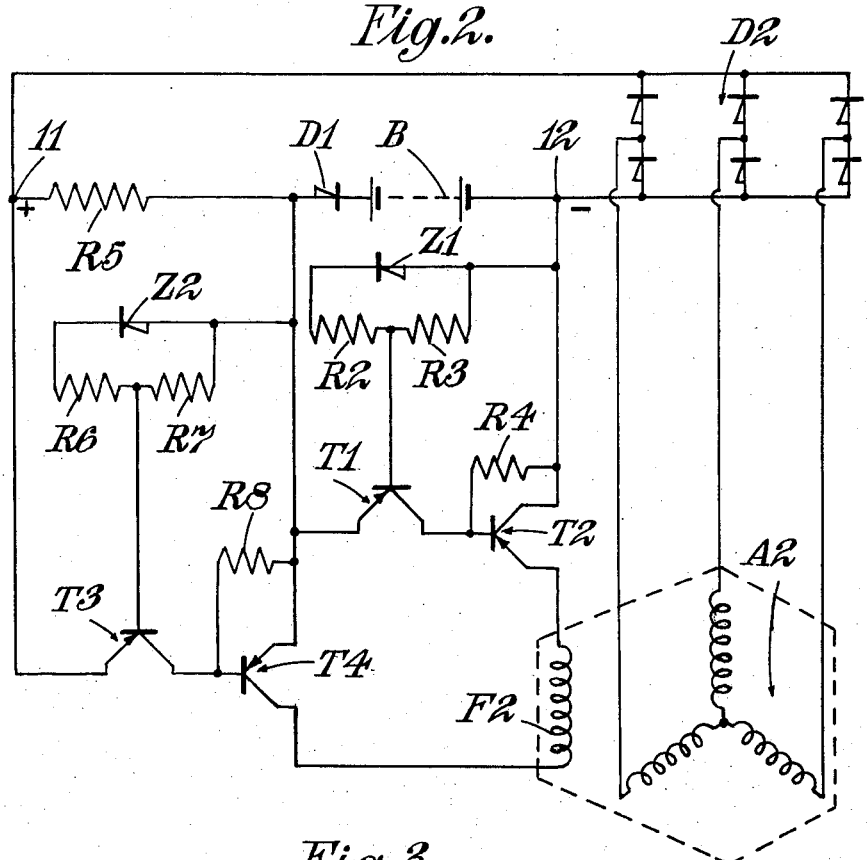
FIGURE 2 is a circuit diagram of a system with voltage and current regulation.

These examples each employ at least one semi-conductor diode. When the voltage across such a semi-conductor diode is in the forward direction (i.e. tending to send current through it in its direction of lesser impedance) the diode will become conducting when the voltage reaches a value of the order of 0.5 volt. When the voltage across it is in the inverse direction the diode will become conducting when the voltage reaches a higher value e.g. of the order of 6 to 8 volts or more, dependent upon the particular diode. In each case conduction through the diode ceases when the voltage across it falls below the value at which it will become conducting. When used to conduct in the inverse direction the diode is called a zener diode.

The system of FIGURE 1 comprises a transistor T1 having an emitter $e1$, a base $b1$ and a collector $c1$, a second transistor T2 having an emitter $e2$, a base $b2$ and a collector $c2$, resistors R1, R2, R3 and R4, and a zener diode Z1. The system has terminals 11, 12 which are connected respectively to the positive and negative output terminals of a D.C. generator driven by the internal combustion engine of a motor vehicle. The field winding F1 of the generator is connected in the circuit as shown.

The vehicle supply battery B (which is normally a 12 or 24 volt battery) is also connected in the circuit as shown and a metal rectifier D1 is included to prevent the battery from discharging through the field winding F1 when the vehicle engine is stationary.

When the vehicle engine is running slowly and the output voltage of the generator does not exceed the desired regulated voltage, the inverse voltage across the zener diode 21 is insufficient to cause it to conduct in that direction and consequently there is no low resistance path between the negative terminal 12 and the base $b1$ of the control transistor T1. Consequently the transistor T1 is held in a non-conductive state. The bias resistor R3 is of sufficiently high resistance to maintain that state in those circumstances. The base $b2$ of the power transistor T2 is connected through the stabilising resistance R4 to the negative terminal 12, and the transistor T2 therefore provides only a low resistance in series with the field winding F; the current in that field winding is thus at a maximum.

When the engine speed, and consequently the generator voltage, rises sufficiently for the zener diode Z1 to conduct in the inverse direction, a low resistance path is provided through it and the low resistance current limiting resistor R2 from the negative terminal 12 to the base $b1$ to the transistor T1. That transistor then provides a low resistance path from the positive terminal 11 to the base $b2$ of the power transistor T2. The transistor T2 thereupon increases its resistance in series with the field winding F1 and so reduces the current through that field winding so as to decrease the output voltage of the generator. The system alternates between the two states described in such a manner as to maintain the voltage between the terminals 11 and 12 substantially constant at the desired regulated voltage over a wide range of vehicle engine speeds.

An alternator may be employed instead of a D.C. generator the output of the alternator being rectified before being supplied to the terminals 11, 12. In that case the current limiting resistor R1 may be omitted if the inherent self-regulating properties of the alternator provide adequate current control.

That system of FIGURE 2 is a development of that shown in FIGURE 1. It embodies a current regulating arrangement and is connected to a three-phase alternator A2 associated with a three-phase metal rectifier D2. A low resistance resistor R5 is connected between the positive terminal 11 and the positive terminal of the battery B, which resistance R5 provides a voltage which is proportional to the current flowing through it. When the alternator is designed for an output of 40 amps., the resistor R5 may have for example a resistance of 0.025 ohm. A power transistor T4 is controlled (in a manner similar to the operation of the circuit of FIGURE 1) by the current control circuit which comprises a control transistor T3 a zener diode Z2 and resistors R6, R7 and R8. The internal emitter-collector resistance of the transistor T4 is connected in series with that of the control transistor T1, the internal emitter-base resistance of the transistor T2, and the field winding F2 of the alternator A2.

Figure 3:
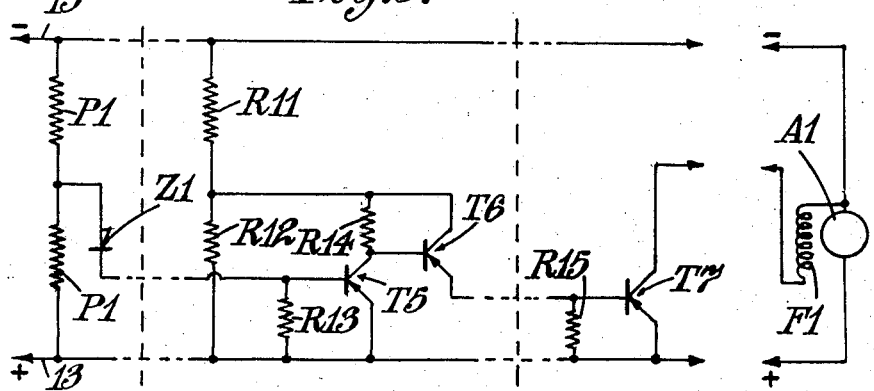
FIGURE 3 is a circuit diagram of a system with voltage regulation.

The voltage regulating system of FIGURE 3 is a modification of that of FIGURE 1. The control transistors T5 and T6 can each be of a lower rating than when a single control transistor is employed. The negative end of the zener diode Z1 is connected to the tapping of a potentiometer P1 across the output 13 and providing for adjustment of the voltage level of regulation. The collectors of the control transistors T5 and T6 are connected to the interconnection between two resistors R11, R12 forming a second potentiometer across the output 13.

When the output voltage is low the control transistor T6 is conductive, the control transistor T5 is nonconductive and the power transistor T7 is conductive in series with the field winding F1 of the D.C. generator A1. When the output voltage rises, the zener diode Z1 conducts in the inverse direction and provides a negative conductive path to the base of the transistor T5, which thereupon conducts to connect the base of the transistor T6 to the positive terminal, thereby rendering the transistor T6 non-conductive. The negative conductive path to the base of the power transistor T7 is thereby interrupted and the transistor T7 presents a high resistance in series with the field F1, thereby reducing the generator output voltage.

Figure 4:
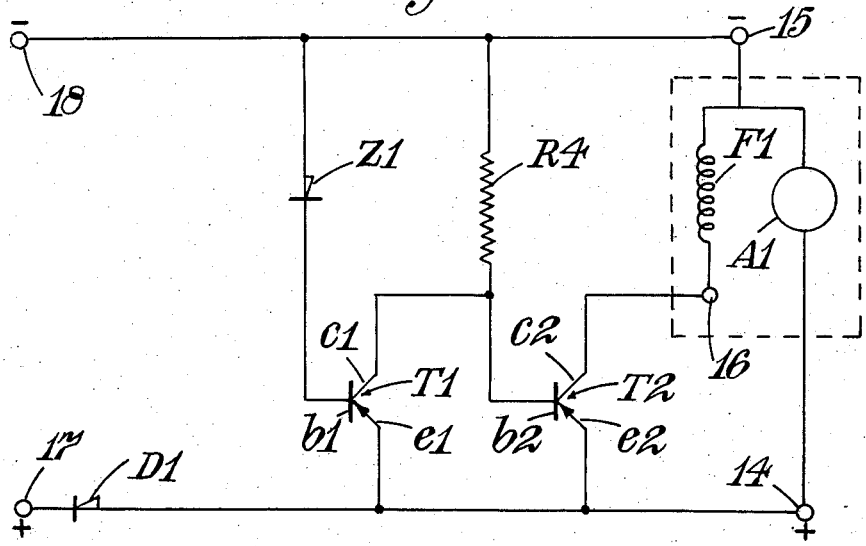
FIGURE 4 is a circuit diagram of a system with voltage regulation.

The system of FIGURE 4 comprises a transistor T1 having an emitter $e1$, a base $b1$ and a collector $c1$, a second transistor T2 having an emitter $e2$, a base $b2$ and a collector $c2$, a resistor R4 and a semi-conductor diode Z1 connected in a direction to act as a zener diode. The system has input terminals 14, 15, 16 connected as shown to the field F1 and armature A1 of a D.C. generator driven by a prime mover, e.g. the internal combustion engine of a motor vehicle or other craft. The system has terminals 17, 18 for connection to a battery B, e.g. the vehicle supply battery, with the polarity indicated. A semi-conductor diode or metal rectifier D1 is included to prevent the battery from discharging through the field F1 and armature A1, when the prime mover is stationary.

When the prime mover is running slowly and the output voltage of the generator does not exceed the desired regulated voltage, the inverse voltage across the zener diode Z1 is insufficient to cause it to conduct in that direction and consequently there is no flow of current from the positive terminal 14 through the emitter $e1$ to the base $b1$ of the transistor T1. Consequently the collector circuit of the transistor T1 does not conduct. The current developed by the residual voltage of the generator can flow through the emitter $e2$ to the base $b2$ of the resistor T2 and through the resistor R4 to the negative terminal 15. Provided that the resistor R4 is of a suitable value to pass enough current to render the transistor T2 sufficiently conductive, the generator output will build up until the impedance of transistor T2 has a low value in series with the field winding F1 and the current in that field winding is thus at a maximum.

When the speed of the prime mover, and consequently the generator voltage, rises sufficiently for the zener diode Z1 to conduct in the inverse direction, a low resistance path is provided from the positive terminal 14 to the negative terminal 15 through the transistor T1, from its emitter $e1$ to its base $b1$, and through the zener diode Z1. The flow of current through that path renders the collector circuit of transistor T1 conductive and the current from the emitter $e2$ to the base $b2$ of transistor T2 is diverted from the transistor T2 to pass through the collector circuit of the transistor T1, that is from the positive terminal 14 to the emitter $e1$ to the collector $c1$ of transistor T1 and through the resistor R4 to the negative terminal 15. To enable this to take place the resistance from the emitter $e1$ to the collector $c1$ of transistor T1 is considerably less than the resistance from the emitter $e2$ to the base $b2$ of transistor T2. This diversion of current from the base circuit of transistor T2 to the collector circuit of the transistor T1 renders the collector circuit of transistor T2 less conductive and causes the field current of the generator, and consequently the voltage generated thereby, to fall until a balance is obtained such that the over voltage of the zener diode is operative to maintain the generator field winding at the value necessary to maintain that over voltage. As the prime mover speed and generator speed varies, the system alternates between the two states described, and as the amount of over voltage on the zener diode required to create a large change in field current is small, the voltage between the terminals 17, 18 is maintained substantially constant over a wide range of prime mover speeds.

Figure 5:
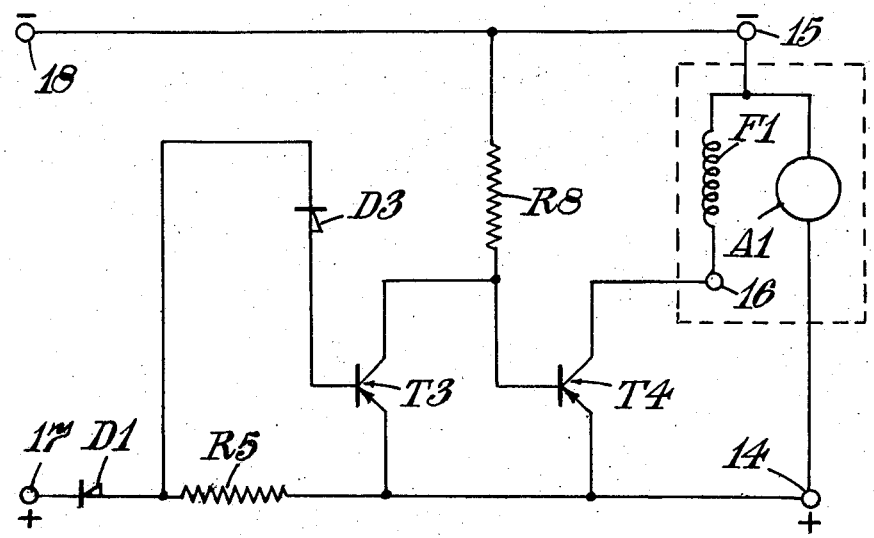
FIGURE 5 is a circuit diagram of a system with current regulation.

The current regulating system of FIGURE 5 operates in a manner very similar to that of the voltage regulating system of FIGURE 4, except that the control voltage for the transistor T3 is derived from a resistor R5 instead of from the output voltage. The low resistance resistor R5 is in series between the terminals 14 and 17 and provides a voltage which is proportional to the output current. As the control voltage derived from the resistor R5 is less than the output voltage (e.g. about 1 volt) the resistor R8, which corresponds to the resistor R4 of FIGURE 4, has a lower resistance than the value of R4. Further, the semi-conductor diode D3 is connected in the forward direction so that it provides a conductive circuit through it when the control voltage derived from resistor R5 reaches a value of the order of 0.5 volt.

One or more of a number of various modifications may be made to either of the systems of FIGURES 4 and 5, and some of these modifications will now be described. The circuits of FIGURES 1, 2, 3, 6 and 7 embody examples of such modifications.

Figure 7:
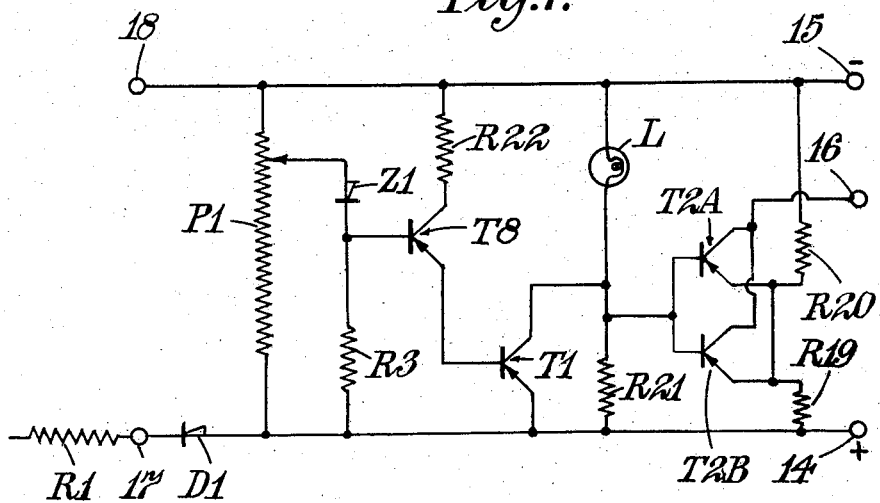
FIGURE 7 is a circuit diagram of a system with voltage regulation.

The output transistor (T2 or T4) may be replaced by two or more transistors connected in parallel. FIGURE 7 shows two such transistors T2A and T2B connected in parallel instead of a single transistor T2. When such parallel-connected transistors are employed it is preferably that the base-emitter resistances of the transistors shall not be identical. Slight out of balance causes one of the transistors to conduct before the other or others and permits a higher value resistor R4 or R8 to be employed.

The output transistor (T2 or T4) may be connected as an emitter follower. In this case the effective voltage between the base of that transistor and the positive terminal of the system is of the same order as the voltage across the generator field and the preceding transistor (T1 or T3) must be capable of handling sufficient power. The resistance of the circuit in series with the field will be low, which facilitates build up of the field current. This modification is embodied in the systems of FIGURES 1 and 2.

The output transistor (T2 or T4) may be preceded by an amplifying transistor, as shown for example in FIGURE 3, in which the transistor T6 is the amplifying transistor. The two transistors T6 and T7 in that example operate in unison.

Figure 6:
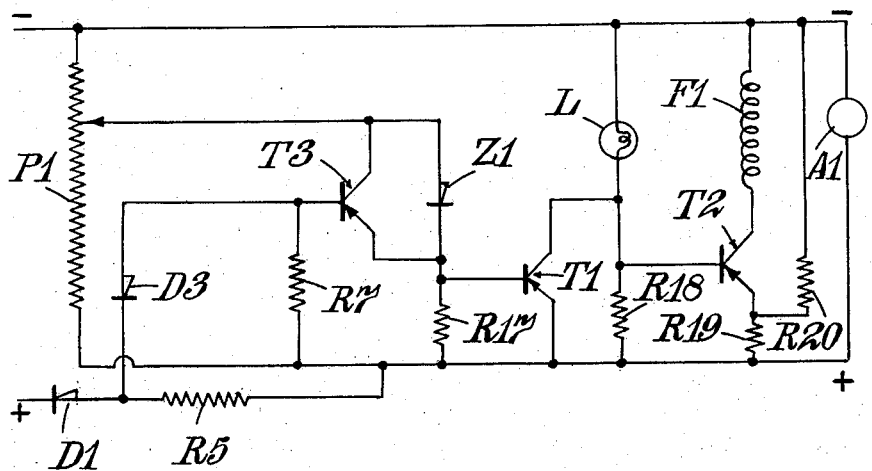
FIGURE 6 is a circuit diagram of a system with voltage and current regulation.

The resistor R4 or R8 may be replaced by a non-linear resistance, e.g. a small lamp bulb, as shown for example in FIGURES 6 and 7 at L. This results in a low resistance value at low generator voltage and a high resistance value at higher generator voltages and gives improved conditions for build up of the field current.

Amplification of the controlling voltage may be provided between the semi-conductor diode and the diverter transistor (T1 or T3). A transistor T8 providing such amplification is provided in FIGURE 7.

The generator may be instead of a D.C. generator, an alternator and a rectifier, as shown for example in FIGURE 2. The rectifier D2 may employ metal or plate rectifiers or semi-conductor rectifying devices, e.g. employing germanium or silicon.

Potentiometer means may be provided for adjusting the value of the regulated voltage without changing the semi-conductor diode. Such means are shown as the potentiometer P1 in FIGURES 3, FIGURES 6 and 7.

Positive bias may be employed to facilitate cut off of the output transistor and to reduce the necessary range of control required by the diverter transistor. Such bias is provided, for example, in FIGURES 4 and 6 by resistors R19 and R20 which form a potentiometer across the generator output.

A shunt resistance may be employed to reduce the base-emitter impedance of a transistor and to enable a safe collector voltage to be obtained. As the impedance between the positive and negative terminals of the system is low, this shunt resistance may be connected between the collector and the base of the transistor. Resistors providing such shunt resistances are shown at R13 and R15 in FIGURE 3, R17 and R18 in FIGURE 6, and R21 in FIGURE 7.

When an amplifying transistor is employed (e.g. the transistor T6 in FIGURE 3) its collector voltage may be limited by feeding it from a potentiometer across the generator output. Such a potentiometer is provided by the resistors R11 and R12 in FIGURE 3.

Current limiting resistors may be employed to prevent excessive currents from flowing through various components e.g. the semi-conductor diodes and small transistors. Such resistors are shown at R2 in FIGURE 1, and R2 and R6 in FIGURE 3.

A form of current control may be obtained by insertion of a series resistor external to the voltage regulated part of the circuit. Such resistors are shown at R1 in FIGURES 1 and 7.

In the system of FIGURE 6, the systems of FIGURES 4 and 5 have been combined together, with the various modifications already referred to and with various components made common to the two combined systems. The base of transistor T1 is controlled both by the zener diode Z1 and by the collector circuit of transistor T3 which is in parallel with the zener diode Z1. The transistor T3 is controlled by the semi-conductor diode D3 as in the system of FIGURE 5.

The values or particulars of the various circuit components of FIGURE 1 are as follows:

| | |
|---|---|
| R1 | 1 ohm. |
| R2 | 100 ohms. |
| R3 | 3,000 ohms. |
| R4 | 15 ohms. |
| T1 | Intermetall type OC 38. |
| T2 | Mullard type OC 16. |

The values or particulars of the various circuit components of FIGURE 2 are as follows:

| | |
|---|---|
| R2 | 100 ohms. |
| R3 | 3,000 ohms. |
| R4 | 15 ohms. |
| R5 | 0.025 ohm. |
| R6 | 100 ohms. |
| R7 | 400 ohms. |
| R8 | 2 ohms. |
| T1 | Intermetall type OC 38. |
| T2 | Mullard type OC 16. |
| T3 | Intermetall type OC 38. |
| T4 | Mullar type OC 16. |
| Z1 and Z2 | Intermetall type Z6, Z7 or Z8. |

The values or particulars of the various circuit components of FIGURE 3 are as follows:

| | |
|---|---|
| P1 | 150 ohms. |
| R11 | 150 ohms. |
| R12 | 50 ohms. |
| R13 | 200,000 ohms. |
| R14 | 15 ohms. |
| R15 | 100,000 ohms. |
| T5, T6 | Intermetall type OC 38. |
| T7 | Mullard type OC 16. |
| Z1 | Intermetall type Z6, Z7 or Z8. |

The values or particulars of the various circuit components of FIGURE 4 are as follows:

| | |
|---|---|
| R4 | 200 ohms. |
| T1 | Mullard type OC 72. |
| T2 | Mullard type OC 16. |
| D1 | G.E.C. type GE 541. |
| Z1 | Intermetall type Z8. |

The values or particulars of the various circuit components of FIGURE 5 are as follows:

| | |
|---|---|
| R5 | 0.05 ohm. |
| R8 | 200 ohms. |
| T3 | Mullard type OC 72. |
| T4 | Mullard type OC 16. |
| D1 | G.E.C. type GEX 541. |
| D3 | Mullard type OA 10. |

The values or particulars of the various circuit components of FIGURE 6 are as follows:

| | |
|---|---|
| P1 | 150 ohms. |
| R5 | 0.06 ohm. |
| R7 | 690 ohms. |
| R17 | 690 ohms. |
| R18 | 69 ohms. |
| R19 | 0.5 ohm. |
| R20 | 50 ohms. |
| F1 | 8 to 10 ohms. |
| L | Lilliput lamp 12 volts, 60 milliamps. |
| T1 | Intermetall type OC 38. |
| T2 | Mullard type OC 16. |
| T3 | Intermetall type OC 38. |
| Z1 | Silicon Zener diode Intermetall (Brush Crystal) type Z8. |
| D1 | Germanium diode G.E.C. type EW54. |
| D3 | Semi-conductor diode type G.J. 3M. |

The values or particulars of the various circuit components of FIGURE 7 are as follows:

| | |
|---|---|
| P1 | 150 ohms. |
| R1 | 0.2 ohm. |
| R3 | 690 ohms. |
| R19 | 1 ohm. |
| R20 | 100 ohms. |
| R21 | 69 ohms. |
| R22 | 1,500 ohms. |
| T1 | Mullard type OC 72. |
| T2A and T2B | Mullard type OC 16. |
| D1 | G.E.C. type GEX 541. |
| Z1 | Intermetall type Z8. |
| L | Philips 60 milliamps, 12 volts. |

The values or particulars of the various circuit components of FIGURE 8 are as follows:

| | |
|---|---|
| R5 | 0.0115 ohm. |
| R7 | 1,000 ohms. |
| R17 | 68,000 ohms. |
| R23 | 133 ohms. |
| R24 | 68 ohms. |
| R25 | 68 ohms. |
| R26 | 1 ohm. |
| R27 | 68 ohms. |
| R28 | 1 ohm. |
| L | Atlas type 955/912Z, 28 volts. |
| T1 | Mullard type OC 72. |
| T2C and T2D | Type 2N386. |
| T3 | Mullard type OC 37. |
| Z1 | Intermetall type Z8. |
| D1 | Type CP2. |
| D3 | Mullard type OA 10. |

The invention is not restricted to the details of the foregoing examples. For instance, PNP transistors are employed in those examples but NPN transistors may alternatively be employed with appropriate modifications.

Mullard type OC 72 transistors may with advantage be employed in place of the Intermetall type OC 38 transistors. A further possibility is to employ G.E.C. type G.E.T. 5. (EW70) transistors in place of the Intermetall type OC 38 transistors. Another possibility is to replace the pair of transistors T5, T6 by a single Mullard type OC 16 transistor.

Provided transistors of adequate voltage rating are employed in the circuit of FIGURE 3, the value of the resistor R11 may be increased to 200 ohms, the resistor R12 may be omitted, and the potentiometer P1 may be omitted, the negative connection to the zener diode Z1 being taken to a tapping on the resistor R11.

The metal rectifier D1 may be replaced by a semi-conductor device. The generator is not necessarily driven by a vehicle engine.

We claim:

1. An electric supply system comprising a D.C. generator having a field winding, at least one output transistor having a first controlled circuit controlled by the output transistor and a first controlling circuit controlling the output transistor, the field winding of the generator being in the said first controlled circuit, and the said first controlling circuit being across the output of the generator and including a non-linear resistance, the non-linear resistance having a characteristic such that its resistance increases with increase in current through it, whereby the resistance of said first controlling circuit of the output transistor increases with increase in the output of the generator, at least one diverter transistor having a second controlled circuit controlled by the diverter transistor and a second controlling circuit controlling the diverter transistor, the said second controlled circuit being across the output of the generator and including the non-linear resistance and by-passing part of the said first controlling circuit, whereby when the said second controlled circuit is conducting, part of the current which passes through the non-linear resistance also passes through the said second controlled circuit instead of through the said part of the first controlling circuit, and connecting means for connecting a load in parallel with the said output and the said controlling circuit, which connecting means include a rectifier having its conducting direction such as to permit current from the generator to pass through it.

2. An electric supply system according to claim 1 further including a second output transistor connected in parallel with said one output transistor.

3. An electric supply system comprising a D.C. generator having a field winding, at least one output transistor having a first controlled circuit controlled by the output transistor and a first controlling circuit controlling the output transistor, the field winding of the generator being in the said first controlled circuit, and the said first controlling circuit being across the output of the generator and including a non-linear resistance, the non-linear resistance having a characteristic such that its resistance increases with increase in current through it, whereby the resistance of said first controlling circuit of the output transistor increases with increase in the output of the generator, at least one diverter transistor having a second controlled circuit controlled by the diverter transistor and a second controlling circuit controlling the diverter transistor, the said second controlled circuit being across the output of the generator and including the non-linear resistance and by-passing part of the said first controlling circuit, whereby when the said second controlled circuit is conducting, part of the current which passes through the non-linear resistance also passes through the said second controlled circuit instead of through the said part of the first controlling circuit, and connecting means for connecting a load in parallel with the said output and the said controlling circuit.

4. An electric supply system according to claim 3 further including a second output transistor connected in parallel with said one output transistor.

References Cited in the file of this patent

UNITED STATES PATENTS

| | | |
|---|---|---|
| 2,717,353 | Sewell et al. | Sept. 6, 1955 |
| 2,776,382 | Jensen | Jan. 1, 1957 |
| 2,780,765 | Chapin et al. | Feb. 5, 1957 |
| 2,806,198 | Fredrick | Sept. 10, 1957 |
| 2,809,301 | Short | Oct. 8, 1957 |
| 2,862,175 | Guyton et al. | Nov. 25, 1958 |
| 2,874,339 | Perlman | Feb. 17, 1959 |

FOREIGN PATENTS

| | | |
|---|---|---|
| 289,568 | Great Britain | May 2, 1928 |